Nov. 15, 1966  D. H. REDMAN  3,286,142
EDGE FOLLOWING SERVO CONTROL
Original Filed Oct. 9, 1961  4 Sheets-Sheet 1

——— GENERATED SIGNAL
——— APPLIED SIGNAL
—·—· RESULTANT SIGNAL

INVENTOR
Derek H. Redman

BY William J. Newman
ATTORNEY

FIG.3.

Nov. 15, 1966  D. H. REDMAN  3,286,142
EDGE FOLLOWING SERVO CONTROL
Original Filed Oct. 9, 1961  4 Sheets-Sheet 3

——— GENERATED SIGNAL
----- APPLIED SIGNAL
—·— RESULTANT SIGNAL

INVENTOR
Derek H. Redman

By *William J. Newman*
Attorney 3,286,142
EDGE FOLLOWING SERVO CONTROL
Derek Harry Redman, Kenley Surrey, England, assignor to Stewart-Warner Corporation, Chicago, Ill.
Continuation of application Ser. No. 144,287, Oct. 9, 1961. This application May 27, 1965, Ser. No. 461,605
26 Claims. (Cl. 318—18)

This invention relates to tracing apparatus and more particularly to tracing apparatus of the type which automatically follows the edge of a profile drawn or projected upon a background of contrasting color. This application is a continuation of applicant's copending application Serial No. 144,287, filed October 9, 1961, now abandoned, which was a continuation-in-part of applicant's parent application Serial No. 91,680, filed February 27, 1961, now abandoned. Apparatuses of this type are generally used for guiding machine tools such as cutting or welding torches to produce a cut or a weld similar to a predetermined pattern or outline.

In early mechanisms for reproducing figures and outlines a tracing device included a pointer which an operator guided along the contour of desired shape. His manipulations steered the tracing device along the contour causing a work tool to follow the outline, either by direct mechanical coupling to the tracing device, or by means of electric signals transmitted from the tracing device to the remotely located tool. This reproduction method was necessarily slow, and frequently inaccurate, which led to further improvements towards automation of the process.

To make reproductions more rapidly and accurately mechanisms were provided in which the tracer automatically followed a prescribed path by the use of a mechanical finger or other means which engaged and followed the contour of a rigid templet. This method obtained wide usage in industry, but it had numerous undesirable features. The templets were expensive to prepare and not easily revised or duplicated. Since the tracer element actually made physical contact with the templet there was considerable wear on the templet, as well as the tracer, which resulted in a relatively short useful life.

More recent developments in the pattern tracing art have been directed towards the use of photoelectric means which optically view the pattern to be duplicated and generate electric signals to operate driving and steering mechanisms. Most of these devices employ scanning means in which a portion of the pattern is cyclically scanned to produce electric pulses in the photosensitive means each time the pattern is encountered. The information in the electric signal output of the photosensitive means is used to guide the scanning device, and, hence, the machine tool mechanically or electrically attached, thereto along the desired pattern. Most of the more recent devices have been developed to trace patterns which take the form of line drawings on a sheet of paper and examples of this type of device may be seen in the U.S. patent to Miles A. McClennan 2,489,305 issued November 29, 1949, and the copending U.S. application to Frans Brouwer, Serial No. 56,920 filed September 19, 1960 now Patent No. 3,124,691.

This invention is directed towards apparatus which are similar to that disclosed in the referenced prior art but which are adapted to follow silhouette-type patterns or profiles which are drawn or projected upon contrasting backgrounds. Although particular reference has been made to the McClennan and Brouwer tracing systems, it is to be understood that the invention is applicable to any tracing system which cyclically scans the pattern to produce a fluctuating electric signal representative of the position of the scanning device with respect to the pattern.

It is an object of this invention to provide tracing systems which may be useful as guide systems for profile cutting machine tools.

It is also an object of this invention to provide tracing systems which will accurately follow the outline edge of silhouette or profile-type patterns drawn or projected on contrasting backgrounds.

There are many industries using tracing machines which still possess templet-type machines and may desire to convert to the simpler and less expensive line pattern tracing machines of the type disclosed in the above referenced patents. Since the templets they still have on hand represent items of capital expenditure it is desirable that the line tracing machines also be adaptable to follow profile-type patterns. It is, therefore, an added object of this invention to provide devices which are readily adaptable for use as either line pattern followers or profile pattern followers.

Other objects and advantages of this invention will be readily recognized upon a further reading of this specification especially when taken in view of the accompanying drawings, in which:

FIGS. 1a through 1d each represent a different position of the device with respect to the image;

FIG. 1e is a graphic representation of the normalized amplitude of the photocell output versus the particular positions of the pattern edge image with respect to the center of vibration;

FIGS. 4a through 4c each represent a different position of the device with respect to the image;

FIG. 4d is a graphic representation of the normalized amplitude of the photocell output versus the particular positions of the pattern edge image wtih respect to the center of the sensitive area;

Briefly this invention resides in apparatuses for indicating the position of the edge of a profile pattern which comprise a scanning device which cyclically scans a field containing a portion of the edge and generates a pulsating electric signal having an amplitude indicative of the position of the scanning device with respect to the pattern being traced. However, this signal is not particularly useful because it does not give any indication of the orientation of the edge portion with respect to the center of the scanning device if the device departs from its aligned position. To obtain a signal containing the necessary information the generated signal is compared with a reference signal opposite in phase to the generated signal and having an amplitude substantially less than the maximum amplitude of the generated signal. The resultant of the two signals will be a fluctuating signal having an amplitude which contains information relating to the distance of the edge portion of the pattern from the center of the scanner. The phase of the resultant signal contains information relating to the orientation of the edge portion with respect to the center of the scanner.

Before undertaking a detailed description of the first embodiment of this invention a general description of the underlying principles involved will be made with specific reference to FIGS. 1 and 2. The representations in these figures contemplate the use of a scanning device of the type described in the previously mentioned Brouwer Patent No. 3,124,691. This scanning device 8 comprises a photocell 10 (FIG. 1) having a sensitive area 12 upon which an image 14 of a portion of the edge of a contour or silhouette-type pattern is projected. An opaque shade 16 is disposed between the sensitive area 12 and the pattern, and is caused to vibrate along a line which is generally transverse to the front-to-back axis 18 of the scanning device. The positions denoted 16a and 16b in FIG. 1 indicate the limits of displacement of the opaque shade as it oscillates about a center of scan. For the purpose of this discussion with reference to FIGS. 1, 2 and 3 the center of the scan coincides with the front-to-back axis 18; however, it is necessary in the device of the first embodiment that the center of scan be offset a predetermined distance in order for the scanning device to accurately follow the pattern as will be hereinafter described.

If the edge of the pattern 14 is projected within the limits of travel of the opaque shade 16 there will be a fluctuation in the light intensity impinging on the sensitive area 12 each time the shade 16 crosses the image of the edge portion. As is well known the fluctuations in light intensity will cause fluctuating changes in the current conducting capabilities of the photocell 10. For example, if the photocell is of the photoresistive semiconductor type, the resistance of the cell will vary inversely with the intensity of the light impinging thereon. When the opaque shade crosses the edge portion 14 toward its left-hand limit position as viewed in FIG. 1, the intensity of the light impinging on the sensitive area 12 increases to cause the resistance of the photocell 10 to decrease. Conversely, as it crosses the edge portion 14 in the other direction toward its right-hand limit position 16b the resistance of the photocell increases due to the reduction of the intensity of light impinging thereon.

If the opaque shade 16 is vibrated at a predetermined frequency, such as by a linear motor energized by a standard 60 cycle source, the electric signal at the output of the photocell 10 will have a 60 cycle component whose magnitude will be indicative of the distance the image of the pattern 14 is removed from the center of scan of the shade 16. The unbroken line waveforms 22a through 22d in FIGS. 2a through 2d are representative of the voltage fluctuations at the output of the photocell at the fundamental frequency of the vibrating shade 16. Each of the representations 2a through 2d corresponds to a particular position of the edge portion of the pattern 14 with respect to the center of scan corresponding to the like-lettered representation in FIGS. 1a through 1d.

Figure 2:
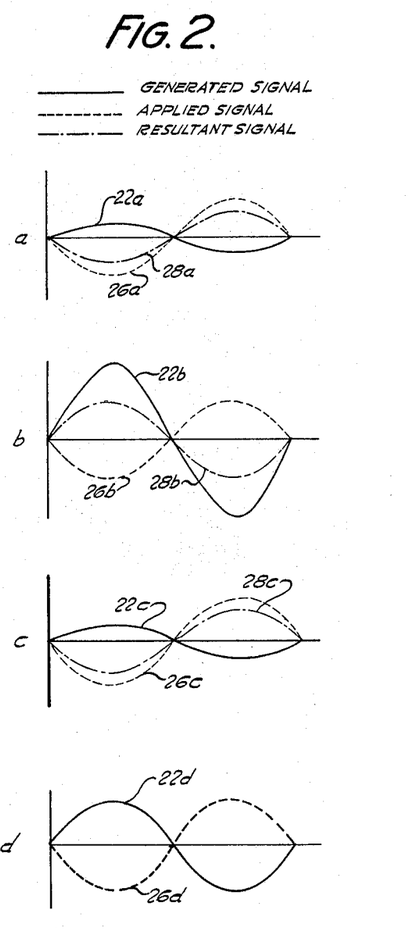
FIGS. 2a through 2d are graphic representations of the voltage waveforms of the photocell output signal for each of the image positions in the corresponding representations in FIGS. 1a through 1d.
Figure 3:
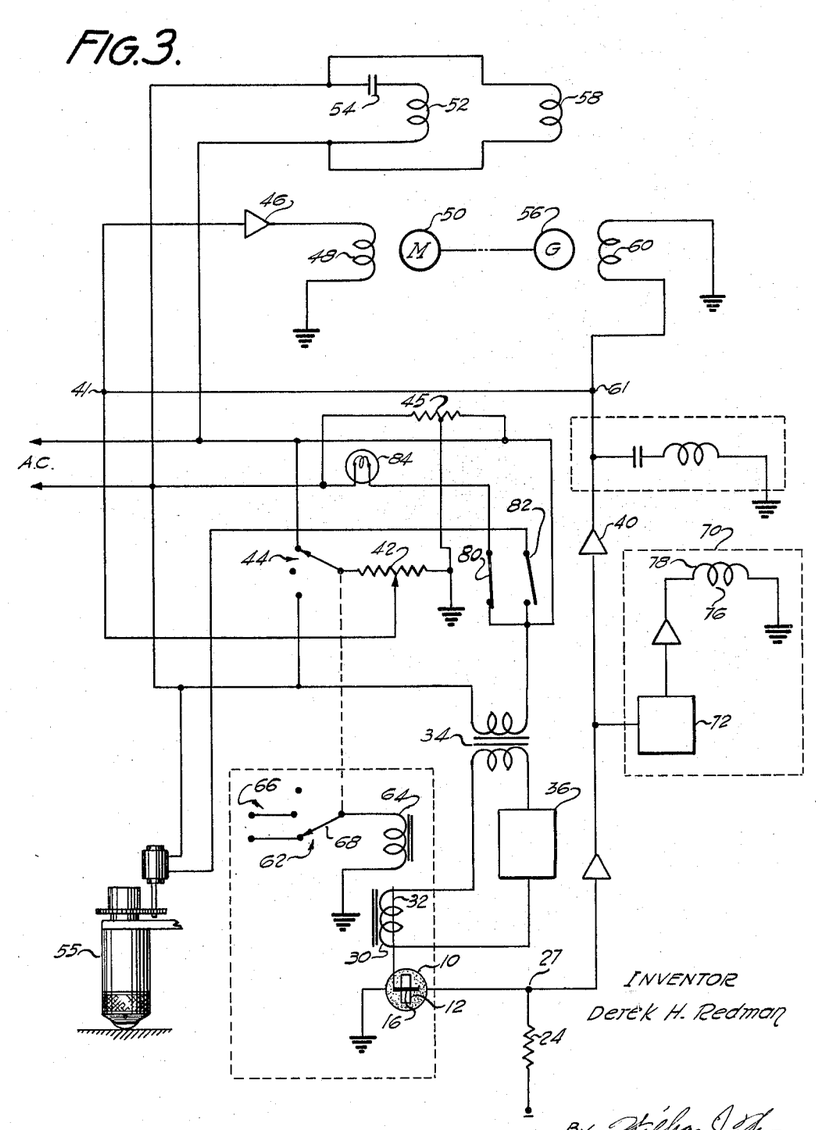
FIG. 3 is a schematic diagram of the electric circuit for one embodiment of this invention.

The waveforms of FIGS. 2a through 2d presuppose the electrical connection of the photocell 10 in a circuit as shown in FIG. 3, wherein the photocell 10 is series connected with a resistor 24 across a negative voltage source, the output voltage waveforms being taken at the junction 27. There are of course many ways to connect the photocell 10 and the one shown in FIG. 3 is representative of one useful in the specific embodiment which will be hereinafter described.

The output waveform 22b shown in FIG. 2b is representative of the condition shown in FIG. 1b, where the edge of the pattern 14 coincides with the center of scan, and has a maximum amplitude at this point. FIGS. 2a and 2c show waveforms having very small amplitudes and correspond to the representations in FIGS. 1a and 1c whereat the image of the edge portion 14 is projected to a position representative of almost the extreme limits at which a fluctuating signal output can be expected.

FIG. 1e is a plot of the amplitude of the generated signal at the output of the photocell vs. the position of the image of the edge portion 14. The positions represented in FIGS. 1a through 1d being projected downward to the abscissa of the plot in FIG. 1e. The plot shows the maximum amplitude for the condition represented in FIG. 1b and the approach toward zero amplitude as the image moves toward the extreme positions beyond those represented in FIGS. 1a and 1c. FIG. 1d represents one position of the image in which the amplitude of the generated signal is approximately one-half of the maximum amplitude which occurs in the condition shown in FIG. 1b. The significance of this condition and the hatched portions in the plot of FIG. 1e will be understood with the description following hereinafter.

The waveforms 22a and 22c, being representative of positions of the edge portion displaced an equal amount on either side of the center of scan, are identical in amplitude and in phase. Thus, the amplitude of the photocell output signal is indicative of the distance the edge portion is from the center of scan, but does not indicate the orientation of the edge portion on one side of the center of scan or the other. The output signal of the photocell, therefore, has little if any utilitarian value while in this form.

It has been found that the output signal of the photocell may be altered, however, so as to contain information regarding the distance and direction the image is offset from a reference position, and, thus, make it useful to drive a servo drive system to maintain the scanning device in a desired position with respect to the image. This may be done by mixing the fundamental component 22 of the photocell output signal with a reference signal 26. The reference signal is phased opposite to the generated fundamental component 22, and has an amplitude substantially less than the maximum amplitude of the generated signal. The maximum occurs, it will be remembered, when the image is in the position represented in FIG. 1b coinciding with the center of scan. The applied signal has a constant amplitude, as shown in each of the configurations (a) through (d) of FIG. 2, and may be of any value which is substantially less than the maximum value of the generated signal shown at 22b in FIG. 2b.

Figure 1:
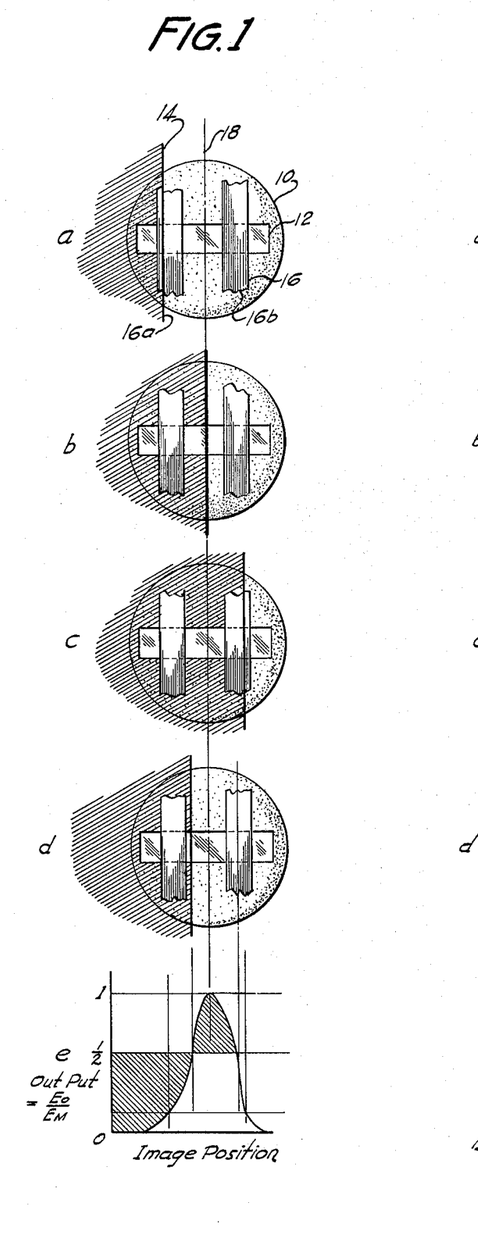
FIG. 1 is a schematic drawing of a scanning device showing the related positions of the image of the pattern edge with respect to the center of vibration of the shutter.

An applied signal 26 of approximately one-half of the amplitude of the maximum generated signal 22b is shown in FIG. 2 and has been selected in order to utilize the most linear portion of the plot shown in FIG. 1e. It is to be understood that a greater or lesser amplitude may be used with adequate success provided it is substantially more than zero amplitude and substantially less than the maximum aplitude. The addition of the generated signal 22 and the applied signal 26 results in a summation signal 28. Since the reference signal 26 and the generated signal for the condition represented by FIG. 1d both have an aplitude which is equal to one-half of the maximum generated signal value 22b, and these signals are phased opposite to each other, the summation signal, when the edge portion is in the position of FIG. 1d, will be zero. This point is represented at 29 in the plot of FIG. 1e. There is of course another position at point 29a in FIG. 1e which is not important to this discussion.

When the position of the image is to the left of null position 29, such as the position shown in FIG. 1a, the resultant 28a will be phased opposite to the generated signal 22a. However, when the image of the edge portion is positioned between the two null positions 29 and 29a, such as for the condition shown in FIG. 1b, the phase of the resultant 28b will be the same as the generated signal but opposite to the resultant 28a. The output signal from the photocell may, therefore, be applied to a phase and amplitude sensitive motor to steer the scanning device in accordance with the pattern design. The steering motor may be so adapted to rotate the sensing head in accordance with the phase of the resultant signal applied thereto. As long as the device remains to the left of the position corresponding to point 29a of FIG. 1e it may be properly oriented by the resultant signal. Beyond the point 29a, however, the device is unstable and the device will not operate properly.

It will be noted in FIG. 1d that there is an offset between the center of scan of the opaque shade 16 and the edge portion of the pattern 14. The offset is a natural phenomenon of the scanning device of the first embodiment of this invention caused by the mechanical type scanning procedure whereby the maximum amplitude signal naturally results when the pattern edge 14 coincides with the center of scan.

The natural displacement would cause the device to follow the pattern with its front-to-back axis 18 offset from the edge of the pattern a predetermined amount equal to the distance represented by one-half the amplitude of the maximum generated signal 22b. The offset may be readily compensated for, if so desired, by shifting the center of a scan to the right, as viewed in FIG. 1d, an amount equal to the natural offset. This may be accomplished in any one of a number of ways which will be described hereinafter.

The foregoing discussion has been directed toward the configuration of FIG. 1 wherein the dark area of the pattern is to the left and the light area to the right with respect to the direction of travel of the scanning device, which is upward as indicated by the arrow on the front-to-back axis 18. In order to operate the device along a pattern in which the light and dark areas are reversed in position, the phase of the reference signal must be reversed. This is because the polarity of the generated signal will be reversed with this orientation. The direction of natural offset will also be reversed when the pattern is reversed, and, therefore, provisions must be made to selectively locate the center of scan on one side of the front-to-back axis or the other depending on the pattern orientation.

It was mentioned hereinbefore that the principles of this invention are applicable to other types of scanning devices besides the McClennan and Brouwer types. Cheverton et al., U.S. Patent No. 2,933,612 and Berry Patent No. 2,499,178 show other types of scanning devices to which this invention is applicable. The Cheverton patent discloses a scanning device in which a photocell having a sensitive area aligned in a direction corresponding to that of the opaque shade 16 in FIG. 1 is vibrated transversely to the edge of the contour pattern. FIG. 1 may be used to describe the operation of this scanning device if it is assumed that the positions 16a and 16b represent the extreme positions of the sensitive area as the photocell vibrates. Again there will be a signal at the output of the photocell which has a fundamental frequency equal to the vibration frequency of the photocell. The waveforms of FIG. 2 are essentially similar to the signal waveforms at the output of the swinging photocell with one major exception. That is, the phase orientation of each of the waveforms 22, 26 and 28 would be opposite to that shown in FIG. 2. The amplitudes, however, will be essentially the same. The rotating scanner of the Berry patent would also produce waveforms which are substantially similar to those shown in FIG. 2 and therefore may be used in contour follower apparatus. It may, in fact, be stated that the basic teachings of this invention are applicable to any scanning device in which the pattern to be followed is cyclically scanned.

Reference is again made to FIG. 3 for a continuation of the description of an electric circuit for one particular embodiment of the present invention. Vibrating means are shown for oscillating the opaque shade 16 across the sensitive portion 12 of the photocell 10 and include an electromagnet 30 and an armature 32 attached to the opaque shade 16. The arm will, therefore, vibrate over the sensitive area photocell in response to an alternating current signal applied through a transformer 34. A phase adjusting circuit 36 is included in the circuit energizing the vibrator means to compensate for phase shifts in various parts of the electrical circuit. The phase adjusting circuit is not shown in detail as it may be any well known type and does not form a part of this invention.

The output of the photocell 10 taken at the junction 27 is fed through two series connected A.C. amplifiers 38 and 40 to a junction 41. The amplified photocell signal is mixed at junction 41 with a constant amplitude signal from the A.C. source provided thereto through a potentiometer 42 to one or the other sides of the A.C. source through a switch 44. A resistor 45 connected across the A.C. soruce with a grounded center tap provides a proper reference for the opposite phases of the reference signal. Switch 44 provides for the selection of an appropriately phased reference signal dependent upon the orientation of the light and dark portions of the pattern with respect to the direction of travel of the scanning device. The potentiometer 42 provides for the selection of a signal of appropriate amplitude to summate with the generated signal at the junction 41.

The resultant signal from junction 41 is amplified by amplifier 46 and applied to one winding 48 of a two phase steering motor 50. The other winding 52 of the motor 50 is connected to the A.C. source through a capacitor 54 which provides a 90° phase shift required to properly phase the signals in the windings of the two phase type motor.

A tachometer generator 56 is directly connected to the shaft of the motor 50 and has one winding 58 connected to the A.C. source. The other winding 60 is connected between ground and the input of amplifier 46 at junction 61 to provide a signal corresponding to the speed of rotation of the motor 50. The generator 56 is so orientated that the signal applied to the input of the amplifier 46 is in opposition to the resultant of the generated and reference signals. When there is a large deviation of the edge portion from the center of scan a relatively large resultant signal tends to drive the steering motor 50 at a high speed. However, as the velocity of the motor 50 increases the output from the tachometer generator 56 increases and opposes the resultant signal to reduce the amplitude of the signal fed to the motor 50. This effect permits the use of large amplification in the servo loop and reduces overshoot, since the maximum amplification of the loop only is reached when the speed of the steering motor is near zero.

The motor 50 is geared to rotate the scanning device 10 and a drive wheel mechanism 55 in a manner essentially as described in the aforementioned Brouwer patent. Thus, the application of a resultant signal 26a corresponding to the phase represented in FIGS. 1a and 2a will cause the motor 50 to rotate the scanning device and the drive wheel mechanism 55 in a counterclockwise direction towards the pattern edge 14. A resultant signal 26b of the phase represented in FIGS. 1b and 2b will cause the motor to rotate in a clockwise direction to again steer the scanning device 10 and the drive wheel mechanism 55 towards the pattern edge 14. When the photocell is in the position represented by FIG. 1d there is essentially no fundamental frequency component in the resultant to cause a rotation of the motor 50.

To compensate for the natural offset between the front-to-back axis of the scanning device and the image of the edge portion, there is provided means 62 for shifting the center of scan a predetermined distance in accordance with the natural offset. The biasing means 62 may comprise, as shown in FIG. 3, an additional electromagnet 64 which is energized by a properly polarized D.C. source 66 through a switch 68 having its arm ganged to the arm of switch 44. When the electromagnet 64 is energized by a D.C. current flowing in one direction or the other it will produce a biasing force on the armature 32 of the linear motor 30 which will shift the center of scan a predetermined distance to one side or the other. Switch 68, being ganged with the reference signal reversing switch 44, will serve to offset the center of vibration of the armature 32 in one direction when the reference signal has one phase and vice versa when the reference signal has the opposite phase.

It is to be understood that other means may be provided for compensating for the natural offset. For example, electromagnet 64 and its energizing circuit may be replaced by a permanent magnet which may be selectably oriented with respect to the linear motor 30 to provide offset in either direction. The natural offset may also be compensated by mechanically displacing the linear motor and the shade 16 with respect to the front-to-back axis of the scanning device. The natural offset might also be compensated for by optical means whereby the image of the pattern edge on the photocell is selectively displaced in the proper direction and a proper distance.

An alarm circuit 70 is also provided in the embodiment of FIG. 3 to give a warning when there is no pattern edge portion in the image projected onto the photocell. It also turns off the A.C. power to the drive wheel mechanism 55. The alternating current signal output from amplifier 38 is converted to direct current by a conventional rectifier 72 whose output is fed to the energizing coil 76 of relay 78. The coil 76 when energized operates normally closed contacts 80 and normally open contacts 82 which are connected in the energizing circuits for warning lamp 84 and the drive wheel mechanism 55, respectively. When a portion of the edge of the pattern is projected onto the sensitive area of the photocell within the sweep of the oscillating shade, a signal is present at the output of amplifier 38 which is rectified and applied to energize the coil 76 of relay 78. The driving mechanism is therefore connected directly to the A.C. source through the closed contacts 82 and the circuit to lamp 84 is opened by the contacts 80. When, however, the apparatus scans a field in which there is no contrasting portions there will be no signal at the output of amplifier 38 and relay 78 will be deenergized. Contacts 82 in the energizing circuit for the drive wheel mechanism will be opened and contacts 80 in the energizing circuit for lamp 84 will be closed. The apparatus, therefore, is immobilized and the lamp 84 warns the operator that the photocell is no longer receiving an image of a contrasting portion of the pattern.

It will be noted that the circuit hereinbefore described is substantially the same circuit described and illustrated in the aforementioned patent of Frans Brouwer. The only differences in the circuit of this application are the means for providing the reference signal to the control winding 48 of the steering motor 50 and the biasing means 62 for compensating for the natural offset between the front-to-back axis and the center of scan. The apparatus may, therefore, be used as an edge follower when the ganged switches 62 and 44 are in either of their two outer contact positions, and may be used as a line tracer, in accordance with the teachings of the Brouwer patent when the switches are in their intermediate contact position. This is an important advantage to industrial users of tracer apparatus in that the same device may be used for tracing either profile patterns or line patterns with a simple modification which is controllable by the operation of the ganged switches.

Figure 4:
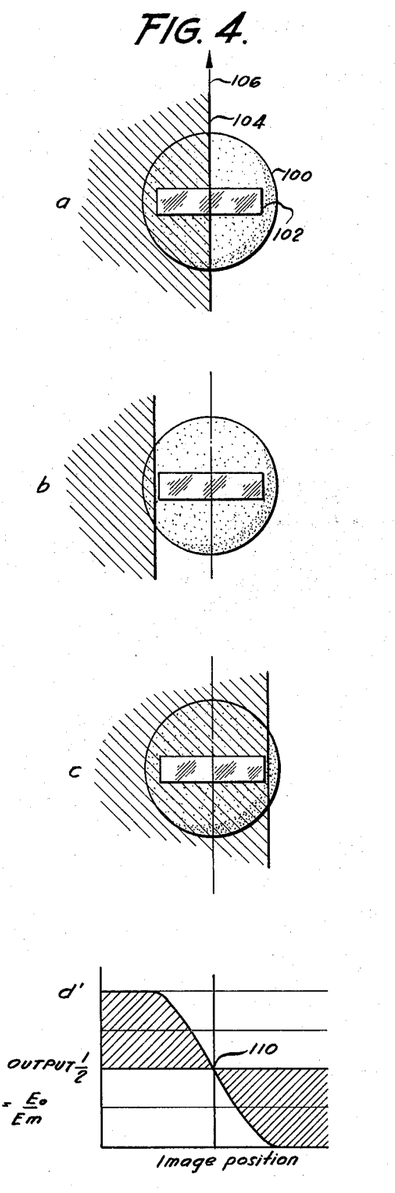
FIG. 4 is a schematic drawing of a scanning device for another embodiment of this invention showing the related positions of the image of the pattern edge with respect to the center of the sensitive area.
Figure 5:
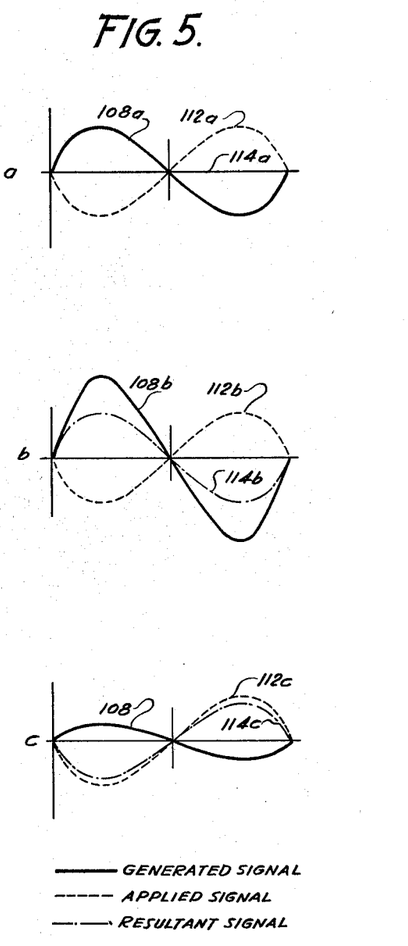
FIGS. 5a through 5c are graphic representations of the voltage waveforms of the photocell output signal for each of the image positions in the corresponding representations of FIGS. 4a through 4e.
Figure 6:
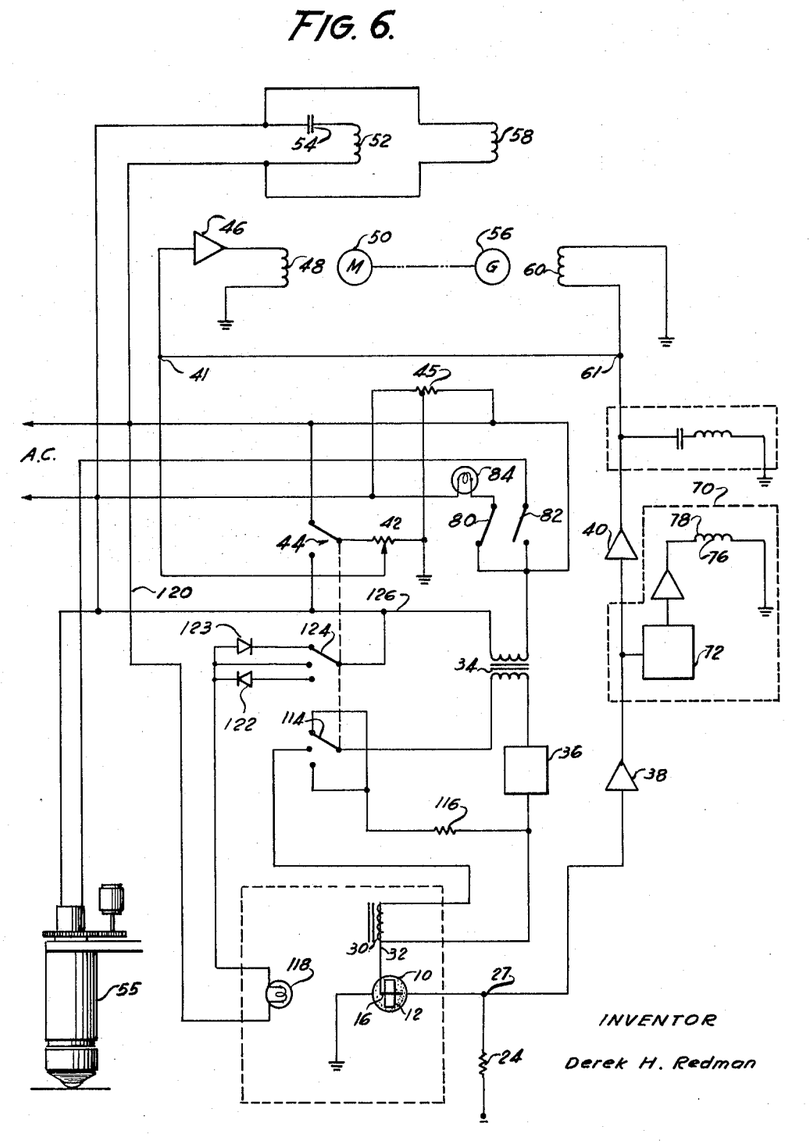
FIG. 6 is a schematic diagram of the electric circuit for the other embodiment of this invention.

A second embodiment of this invention will now be described for which the circuit diagram is shown in FIG. 6. However, a general description of the basic principles involved will first be made with specific reference to FIGS. 4 and 5.

The scanning device for this embodiment comprises a photocell 100 having a sensitive area 102 upon which an image 104 of a portion of the edge of the contour or silhouette-type pattern is projected. The senstive area 102 is positioned transversely across and is centered about the front-to-back axis 106 of the scanning device. This sensing device differs from the one used in the first embodiment, however, in that it does not have a vibrating opaque shade to periodically interrupt the image of the edge portion. Rather, the image is periodically interrupted by causing the light impinging on the pattern to be periodically interrupted. Assuming that the photocell 100 is viewing a reflective surface, the flickering light source will cause the electric output of the photocell to vary in accordance with the flickering light source. That is, if the light source is pulsating at a 60 cycle per second rate the output of the photocell will have a fluctuating component having 60 cycle harmonic components. If the photocell is viewing a surface which is completely light absorbent, however, the flickering light source will have no effect on the output of the photocell and, hence, the photocell output will contain no component of the frequency of the light source. It may, therefore, be seen that the varying positions of the edge portion with respect to the front-to-back axis 106 of the sensing device as shown in FIGS. 4a through 4c will affect the output waveforms 108a through 108c in a manner as shown in the representations in FIGS. 5a through 5c. Assuming that the shaded portion to the left of the pattern edge 104 in FIGS. 4a through 4c represents a light absorbent surface and the unshaded portion to the right of the pattern edge 104 is a light reflective surface, the photocell output signal 108b in FIG. 5b corresponding to the position of FIG. 4b will have a large amplitude compared to the signal 108c in FIG. 5c corresponding to the position of FIG. 4c.

The alternating component of the photocell output will have a maximum amplitude when the photocell sensitive area is completely over a reflective surface and will have a minimum amplitude when the photocell sensitive area 102 is completely over an absorbent surface. It may, therefore, be presumed that when the photocell sensitive area 102 is viewing an area which is half absorbent and half reflective, such as when the edge portion 104 passes through the center of the sensitive area 102 as shown in FIG. 4a, the amplitude of the photocell output will be approximately half-way between the maximum and minimum amplitudes. It is to be understood that the terms "absorbent" and "reflective" areas are used in a relative sense for purposes of simplifying the description and that the device may be used to trace the demarcation between any contrasting light or colored surfaces.

FIG. 4d is a plot of the amplitude of the generated signal at the output of the photocell versus the position of the image of the edge portion 104. The positions represented in FIGS. 4a through 4c have been projected downward to the abscissa of the plot in FIG. 4d, and the plot shows that the output signal has a maximum amplitude when the sensitive area 102 of the photocell 100 is viewing only a reflective surface, and has a minmum amplitude when the sensitive area is viewing only an absorbent surface. When the edge portion 104 is directly in line with the center of the sensitive area 102, the amplitude of the output signal is approximately half-way between the maximum and minimum amplitudes. This is shown at reference No. 110 in FIG. 4d and represents the amplitude of the configuration shown in FIG. 4a.

In this embodiment also, the signal at the output of the photocell 100 has little, if any, utilitarian value to accurately describe the position of the edge portion 104 with respect to the front-to-back axis 106 of the sensing head. In this case, however, the photocell output signal has a greater amplitude when the edge portion is to the left of the center of the sensitive area than when the edge portion is to the right of the center of the sensitive area.

As in the first embodiment, the output signal from the photocell may be altered so as to contain information which directly pertains to the distance and direction the image is displaced from the center of the sensitive area. The output signal may be mixed with a reference signal 112 having an amplitude equal to, but phased opposite from, the signal representative of the reference condition shown in FIG. 4a. If the output signal 108 and the applied signal 112 are algebraically added as shown in FIG. 5, the resultants for the three conditions shown in 5a through 5c will have waveforms as shown at reference Nos. 114a through 114c. When the edge portion is aligned with the center of the sensitive area 102, the resultant signal will have zero amplitude, whereas it will have maximum amplitude at either of the two conditions shown in FIGS. 4b and 4c. The phases of the signals representing these conditions will, however, be opposite to one another which will, therefore, indicate which direction the center of the sensitive area is offset from the image of the edge portion 104. The amplitude of the resultant signal will, of course, be indicative of the amount of displacement of the center of the sensitive area from the image of the edge portion 104.

This embodiment differs from the first embodiment in that by scanning the pattern with a flickering light source rather than a vibrating shade, the natural offset caused by adding the applied signal to the photocell output signal is eliminated. The resultant signal may be used directly to energize a steering mechanism for the sensitive head without making provisions for compensating for the natural offset.

The foregoing discussion of the second embodiment has been directed to the condition where the absorbent or dark area is to the left with respect to the direction of travel of the scanning device and the reflective or light portion is to the right. To operate the device along the pattern in which the position of the dark and light areas are reversed, one need merely reverse the polarity of the applied signal in order to compensate for the natural reverse in polarity of the generated signal. Since there is no natural offset in this embodiment no provisions must be made to relocate the center of the sensitive area with respect to the front-to-back axis 104 of the sensing device.

This embodiment of the invention is also compatible for use with a line tracer mechanism of the type disclosed in the aforementioned patent to Brouwer. The circuit diagram shown in FIG. 6 is similar to the one shown in FIG. 3 for the first embodiment, the only changes being in the provisions for a flickering light source and the elimination of the biasing means for the natural offset of the first embodiment. A complete description of the diagram will not be made since it operates, for the most part, in an identical manner as hereinbefore described for the first embodiment. The reference numbers for all of the circuit components which are compatible with this embodiment remain the same and new numbers are used for referencing those parts which must be added or modified.

The circuit diagram shows a device which may be also used as a line tracer, and, when used as such, requires the use of the vibrating shutter 16 with its vibrator mechanism 30. However, when the device is to be used as an edge follower in accordance with this embodiment, a flickering light source provides the cyclic scan and the shutter 16 must not vibrate. A switch 114 is, therefore, ganged to the applied signal reversing switch 44 for disconnecting the vibrator mechanism 30 from its energizing source at its two extreme contact positions. In these positions a resistor 116 is connected across the secondary of the transformer 34 to dissipate the electrical energy in secondary circuit of transformer 34 when the vibrator mechanism 30 is not connected. When the switch 114 is in its center position, the vibrator mechanism is connected so as to operate the device as a line tracer.

The pulsating light is provided for illuminating the viewed portion of the pattern from a lamp 118 which is connected across the alternating current source by a circuit comprising lead 120 from one side of the alternating current source, lamp 118, rectifier 122 or 123, switch 124, and lead 126 returning to the other side of the alternating current source. The switch 124 is also ganged to the applied signal reversing switch 44 so that the lamp 118 is energized through the rectifier 122 when the ganged switches are in their extreme positions whereat the device operates as an edge follower. When the ganged switches are in their center positions to operate the device as a line tracer, the rectifier 122 is by-passed to eliminate the 60 cycle flicker. The rectifier causes the lamp to light only once for every cycle of alternating current supplied from the source so as to provide a pulsating light having the same frequency as the reference signal.

The reference signal is again applied to junction 41 by the reversing network comprising potentiometer 42, resistors 45 and reversing switch 44. The generated signal from the photocell 10 is amplified and mixed with the reference signal at junction 41, the resultant of which is amplified by the amplifier 46 and applied to the steering motor 50. As in the first embodiment the motor 50 is adapted to steer the sensing device in a direction dependent upon the polarity of the resultant signal to steer the device towards the edge portion of the pattern.

While there have been described herein two specific embodiments of the present invention, it will be recognized that many modifications may be made thereto without deviating from its basic teachings. It is, therefore, intended that this invention be limited only by the scope of the appended claims.

What is claimed is:

1. Apparatus for indicating the position of the edge of an object relative to the center of a scan, said apparatus comprising a scanning device which cyclically scans a field containing a portion of said edge and generates a pulsating electrical signal having an amplitude indicative of the distance of said edge portion from the center of the scan, means for providing a constant amplitude signal phased opposite to said generated signal and having an amplitude approximately equal to one half of the maximum amplitude of said generated signal corresponding to an aligned position of said edge portion with the center of the scan, and means for algebraically adding said signals whereby the magnitude and phase of the summation signal contain information relating to the distance and orientation, respectively, of the edge portion with respect to the center of the scan.

2. Apparatus for indicating the position of the edge of an object relative to the center of a scan, said apparatus comprising a scanning device which cyclically scans a field containing a portion of said edge and generates a pulsating electrical signal having an amplitude indicative of the distance of said edge portion from the center of the scan, means for providing a constant amplitude signal phased opposite to said generated signal and having an amplitude substantially less than the maximum amplitude of said generated signal corresponding to an aligned position of said edge portion with the center of the scan, and means for algebraically adding said signals whereby the magnitude and phase of the summation signal contain information relating to the distance and orientation, respectively, of the edge portion with respect to the center of the scan.

3. Apparatus for indicating the position of the edge of an object relative to the center of a scan, said apparatus comprising a scanning device which cyclically sweeps a field containing a portion of said edge and generates a pulsating electrical signal having an amplitude indicative of the position of said edge portion with respect to the center of the scan, means for providing a constant amplitude signal phased opposite to said generated signal and having an amplitude substantially less than the maximum amplitude of said generated signal corresponding to an aligned position with the center of the scan, means for adding said signals the magnitude and phase of the summation signal being indicative of the distance and orientation, respectively, of the edge portion with respect to a position offset from the center of the scan, and means for compensating for said predetermined offset distance.

4. Apparatus for indicating the position of the edge of an object relative to the center of a scan, said apparatus comprising a scanning device which cyclically sweeps a field containing a portion of said edge and generates a pulsating electrical signal having an amplitude indicative of the position of said edge portion with respect to the center of the scan, means for providing a constant amplitude signal phased opposite to said generated signal and having an amplitude approximately equal to one half the maximum amplitude of said generated signal corresponding to an aligned position of said edge portion with the center of the scan, means for adding said signals whereby the magnitude and phase of the summation signal is indicative of the distance and orientation, respectively, of the edge portion with respect to a position offset a predetermined distance from the center of the scan, and biasing means for compensating for said predetermined offset distance.

5. Apparatus for indicating the position of the front-to-back axis of the apparatus with respect to the edge of an object, said apparatus comprising a scanning device which cyclically sweeps a field containing a portion of said edge and generates a pulsating eletrical signal having an amplitude inversely related to the distance of said edge portion from the center of the cyclic scan, means for providing a constant amplitude signal phased opposite to said generated signal and having an amplitude substantially less than the maximum amplitude of the generated signal corresponding to an aligned position of said edge portion with the center of the scan, means for adding said signals the amplitude and phase of the summation signal being directly related to the distance and orientation of the edge portion with respect to a position displaced a predetermined distance from the center of the scan, and means for maintaining the center of scan offset from the front-to-back axis by said predetermined distance.

6. A system for tracing the edge of a pattern on a contrasting background comprising a scanning device, said scanning device comprising photosensitive means having a sensitive area positioned to have an image of the scanning field containing a portion of the pattern edge cast thereon, said photosensitive means adapted to cause fluctuations in an electric signal proportional to variations in light intensity, means for periodically interrupting the image of the edge portion on the sensitive area and defining a reference line, the amplitude of signal fluctuations caused by the periodic interrupting of the image being indicative of the distance of the image of said edge portion from said reference line, means synchronized with said interrupting means for providing a constant amplitude signal phased opposite to said fluctuating signal and having an amplitude substantially less than the maximum amplitude of said fluctuating signal corresponding to an aligned position of said edge portion with the reference line, means for adding said signals and means responsive to the amplitude and phase of said summation signal for moving said scanning device to orient said reference line toward a reference position with respect to said edge portion.

7. Apparatus for indicating the position of the edge of an object comprising a scanning device, said scanning device comprising photosensitive means having a sensitive area positioned to have an image of the scanning field containing a portion of said edge cast thereon, said photosensitive means adapted to cause fluctuations in an electric signal proportional to variations in light intensity, means for periodically interrupting the image of the edge portion on the sensitive area and defining a reference line, the amplitude of signal fluctuations caused by the periodic interruption of said image being indicative of the distance of the image of said edge portion from said reference line, means synchronized with said interrupting means for providing a constant amplitude signal phased oppositely to said fluctuating signal and having an amplitude approximately equal to one half the maximum amplitude of said fluctuating signal corresponding to an aligned position of said edge portion with the reference line, and means for adding said signals whereby the magnitude and phase of the summation signal are indicative of the distance and orientation, respectively, of the image of the edge portion with respect to a position offset a predetermined distance from said reference line.

8. Apparatus for indicating the position of the edge of an object comprising a scanning device, said scanning device comprising photosensitive means having a sensitive area positioned to have an image of the scanning field containing a portion of said edge cast thereon, said photosensitive means adapted to cause fluctuations in an electric signal proportional to variation in light intensity, means for periodically interrupting the image of the edge portion on the sensitive area and defining a reference line, the amplitude of signal fluctuations caused by the periodic interruption of said image being indicative of the distance of the image of said edge portion from said reference line, means synchronized with said interrupting means for providing a constant amplitude signal phased opposite to said fluctuating signal and having an amplitude substantially less than the maximum amplitude of said fluctuating signal corresponding to an aligned position of said edge portion with the reference line, and means for adding said signals whereby the magnitude and phase of the summation signal are indicative of the distance and orientation, respectively, of the image of the edge portion with respect to a position offset a predetermined distance from said reference line.

9. Apparatus for indicating the position of the edge of an object comprising a scanning device, said scanning device comprising photosensitive means having a sensitive area positioned to have an image of the scanning field containing a portion of said edge cast thereon, said photosensitive means adapted to cause fluctuations in an electric signal proportional to variations in light intensity, means for periodically interrupting the image of the edge portion on the sensitive area and defining a reference line, the amplitude of signal fluctuations caused by the periodic interruption of said image being indicative of the distance of the image of said edge portion from said reference line, means synchronized with said interrupting means for providing a constant amplitude signal phased opposite to said fluctuating signal and having an amplitude substantially less than the maximum amplitude of said fluctuating signal corresponding to an aligned position of said edge portion with the reference line, means for adding said signals whereby the magnitude and phase of the summation signal are indicative of the distance and orientation, respectively, of the image of the edge portion with respect to a position offset a predetermined distance from said reference line, and means for compensating for said offset.

10. The apparatus of claim 9 comprising in addition means for reversing the polarity of said constant amplitude signal.

11. Apparatus for determining the position of the edge of a pattern on a contrasting background comprising a scanning device, said scanning device comprising photosensitive means having a sensitive area positioned to have an image of a portion of the pattern edge cast thereon, said photosensitive means adapted to cause fluctuations in an electric current dependent on changes in light intensity, opaque means disposed between the sensitive area and the edge portion, means for oscillating said opaque means essentially transversely to said edge portion for periodically obstructing the image of said edge portion and causing a periodically fluctuating signal in said photosensitive means, said fluctuating signal having an amplitude indicative of the distance of the image of said edge portion from a reference line defined by the center of the oscillations, means synchronized with said oscillating means for providing a constant amplitude signal phase opposite to and having an amplitude substantially less than the maximum amplitude of said fluctuating signal corresponding to an aligned position of said edge portion with the reference line and means for adding said signals.

12. Apparatus for determining the position of the edge of a pattern on a contrasting background comprising a scanning device, said scanning device comprising photosensitive means having a sensitive area positioned to have an image of a portion of the pattern edge cast thereon, said photosensitive means adapted to cause fluctuations in an electric current dependent on changes in light intensity, opaque means disposed between the sensitive area and the edge portion, means for oscillating said opaque means essentially transversely to said edge portion for periodically obstructing the image of said edge portion and causing a periodically fluctuating signal in said photosensitive means, said fluctuating signal having an amplitude indicative of the distance of the image of said edge portion from a reference line defined by the center of the oscillations, means synchronized with said oscillating means for providing a constant amplitude signal phased opposite to and having an amplitude equal to approximately one half the maximum amplitude of said fluctuating signal corresponding to an aligned position of said edge portion with the reference line, and means for adding said signals.

13. Apparatus for following the edge of a pattern on a contrasting background comprising a scanning device, said scanning device comprising photosensitive means having a sensitive area positioned to have an image of a portion of the pattern edge cast thereon, said photosensitive means adapted to cause fluctuations in an electric current dependent on changes in light intensity, opaque means disposed between the sensitive area and the edge portion, means for oscillating said opaque means essentially transversely to said edge portion for periodically obstructing the image of said edge portion and causing a periodically fluctuating signal in said photosensitive means, said fluctuating signal having an amplitude indicative of the distance of the image of said edge portion from a reference line defined by the center of the oscillations, means synchronized with said oscillating means for providing a constant amplitude signal phased opposite to and having an amplitude substantially less than the maximum amplitude of said fluctuating signal corresponding to an aligned position of said edge portion with the reference line, means for adding said signals the amplitude and phase of the summation signal being indicative of a position of the image of said edge portion offset a predetermined distance from said reference line, means for compensating for said predetermined distance, and means responsive to said summation signal for aligning said scanning device with said edge portion.

14. Apparatus for indicating the position of the edge of an object relative to the center of scan, said apparatus comprising a pulsating light source for illuminating a portion of said edge, a scanning device which scans said edge portion and generates responsive to the pulsating light intensity a pulsating electric signal having an amplitude indicative of the distance of said edge portion from the center of scan, means for providing a constant amplitude signal phased opposite to said generated signal and having an amplitude approximately equal to one-half the maximum amplitude of the generated signal corresponding to a position of said scanning device viewing maximum light intensity, and means for adding said signals whereby the magnitude and phase of the summation signal are indicative of the distance and orientation, respectively, of the edge portion with respect to said center of the scan.

15. Apparatus for indicating the position of the edge of an object relative to the center of a scan, said apparatus comprising a pulsating light source for illuminating a portion of said edge, a scanning device which scans said edge portion and generates responsive to the pulsating light intensity a pulsating electric signal having an amplitude indicative of the distance of said edge portion from the center of scan, means for providing a constant amplitude signal phased opposite to said generated signal and having an amplitude substantially less than the maximum amplitude of said generated signal corresponding to a position of said scanning device viewing maximum light intensity, and means for adding said signals whereby the magnitude and phase of the summation signal are indicative of the distance and orientation, respectively, of the edge portion with respect to said center of scan.

16. A system for tracing the edge of a pattern on a contrasting background comprising a scanning device, said scanning device comprising photosensitive means having a sensitive area positioned to have an image of the scanning field containing a portion of the pattern edge cast thereon, said photosensitive means adapted to cause fluctuations in an electric signal proportional to variations in light intensity, a pulsating light source for illuminating said scanning field, the amplitude of signal fluctuations caused by the pulsating light being indicative of the distance of the image of said edge portion from the center of said sensitive area, means synchronized with said interrupting means for providing a constant amplitude signal phased opposite to said fluctuating signal and having an amplitude substantially less than the maximum amplitude of said fluctuating signal corresponding to a position whereat an image of maximum light intensity is cast on said sensitive area, means for adding said signals and means responsive to the amplitude and phase of said summation signal for moving said scanning device to orient the center of the sensitive area toward a reference position with respect to said edge portion.

17. A system for tracing the edge of a pattern on a contrasting background comprising a scanning device, said scanning device comprising photosensitive means having a sensitive area positioned to have an image of the scanning field containing a portion of the pattern edge cast thereon, said photosensitive means adapted to cause fluctuations in an electric signal proportional to variations in light intensity, a pulsating light source for illuminating said scanning field, the amplitude of signal fluctuations caused by the pulsating light being indicative of the distance of the image of said edge portion from the center of said sensitive area, means synchronized with said interrupting means for providing a constant amplitude signal phased opposite to said fluctuating signal and having an amplitude approximately equal to one-half the maximum amplitude of said fluctuating signal corresponding to a position whereat an image of maximum light intensity is cast on said sensitive area, means for adding said signals and means responsive to the amplitude and phase of said summation signal for moving said scanning device to orient the center of the sensitive area toward a reference position with respect to said edge portion.

18. Apparatus for indicating the position of the edge of an object comprising a scanning device, said scanning device comprising photosensitive means having a sensitive area positioned to have an image of the scanning field containing a portion of said edge cast thereon, said photosensitive means adapted to cause fluctuations in an electric signal proportional to variations in light intensity, a pulsating light source for illuminating said edge portion, the amplitude of signal fluctuations caused by the pulsating light being indicative of the distance of the image of said edge portion from the center of said sensitive area, means synchronized with said pulsating light source for providing a constant amplitude signal phased opposite to said fluctuating signal and having an amplitude approximately equal to one-half the maximum amplitude of said fluctuating signal corresponding to a position whereat an image of maximum light intensity is cast on said sensitive area, and means for adding said signals whereby the magnitude and phase of the summation signal are indicative of the distance and orientation, respectively, of the image of the edge portion with respect to the center of said sensitive area.

19. Apparatus for indicating the position of the edge of an object comprising a scanning device, said scanning device comprising photosensitive means having a sensitive area positioned to have an image of the scanning field containing a portion of said edge cast thereon, said photosensitive means adapted to cause fluctuations in an electric signal proportional to variations in light intensity, a pulsating light source for illuminating said edge portion, the amplitude of signal fluctuations caused by the pulsating light being indicative of the distance of the image of said edge portion from the center of said sensitive area, means synchronized with said pulsating light source for providing a constant amplitude signal phased opposite to said fluctuating signal and having an amplitude substantially less than the maximum amplitude of said fluctuating signal corresponding to a position whereat an image of maximum light intensity is cast on said sensitive area, and means for adding said signals whereby the magnitude and phase of the summation signal are indicative of the distance and orientation, respectively, of the image of the edge portion with respect to said reference line.

20. Apparatus for indicating the position of the edge of a pattern on a contrasting background relative to a center of scan comprising a scanning device which cyclically scans the image of a portion of said edge at a fundamental frequency and produces a fluctuating electric signal responsive to fluctuating light intensity, said electric signal having a fundamental frequency component the amplitude of which is indicative of the distance of the image of said edge portion from the center of scan, means for providing a constant amplitude signal phased oppositely thereto and having an amplitude substantially less than the maximum amplitude of said fluctuating component, and means for adding said signals whereby the magnitude and phase of the summation signal are indicative of the position of the image of the edge portion with respect to said center of scan.

21. Apparatus for indicating the position of an edge of a pattern formed by two contrasting backgrounds relative to a center of scan comprising a scanning device having at least one sensitive area for viewing an image of a portion of said edge, means responsive to said sensitive area for providing a fluctuating electric signal of a predetermined frequency and phase having a maximum signal amplitude when said sensitive area is viewing only one of said backgrounds and a minimum signal amplitude when viewing only the other of said backgrounds, means for providing an oppositely phased signal of said predetermined frequency having an amplitude approximately midway between said maximum and minimum signal amplitudes, and means for combining said signals to provide a resultant signal the amplitude and phase of which are indicative of the amount and direction of deviation of the image of said edge from said center of scan.

22. Apparatus for indicating the position of an edge of a pattern formed by two contrasting backgrounds relative to a center of scan comprising a scanning device having at least one sensitive area for viewing an image of a portion of said edge, means responsive to said sensitive area for providing a fluctuating electric signal of a predetermined frequency and phase having a maximum signal amplitude when said sensitive area is viewing only one of said backgrounds a minimum signal amplitude when viewing only the other of said backgrounds and an intermediate signal amplitude when viewing equal portions of both backgrounds, means for providing an oppositely phased signal of said predetermined frequency having an amplitude equal to said intermediate signal amplitude, and means for combining said signals to provide a resultant signal the amplitude and phase of which are indicative of the amount and direction of deviation of the image from said center of scan.

23. Apparatus for indicating the position of an edge of a pattern formed by two contrasting backgrounds relative to a center of scan comprising a scanning device having at least one sensitive area for viewing an image of a portion of said edge, means responsive to said sensitive area for providing a fluctuating electric signal of a predetermined phase having a maximum value characteristic when said sensitive area is viewing only one of said backgrounds and a minimum value characteristic when viewing only the other of said backgrounds, means for providing an oppositely phased signal having a characteristic value approximately midway between said maximum and minimum values, and means for combining said signals to provide a resultant signal the characteristic of which is indicative of the position of image from said center of scan.

24. Apparatus for indicating the position of an edge of a pattern formed by two contrasting backgrounds relative to a center of scan comprising a scanning device having at least one sensitive area for viewing an image of a portion of said edge, a light source for illuminating said edge, means for pulsating said light source at a predetermined frequency means operable responsive to said sensitive area for providing a fluctuating electric signal of said predetermined frequency having a maximum value when said sensitive area is viewing only one of said backgrounds and a minimum value when viewing only the other of said backgrounds, and means for opposing said signal with an oppositely phased signal of said predetermined frequency having an amplitude approximately midway between said maximum and minimum values to provide a resultant signal the magnitude and phase of which are indicative of the position of image from said center of scan.

25. A system for tracing along an indicium which may alternatively be a line and an edge formed of two contrasting backgrounds comprising a scanning device defining a center of scan and having at least one photoelectric sensitive area for viewing an image of a portion of said indicium; means responsive to said sensitive area when viewing said edge for providing a fluctuating electric signal of predetermined frequency and phase having a maximum signal amplitude when said sensitive area is viewing only one of said backgrounds and a minimum signal amplitude when viewing only the other of said backgrounds, means for providing an oppositely phased signal of said predetermined frequency having an amplitude approximately midway between said maximum and minimum signal amplitudes, and means for combining said signals to provide a resultant signal the amplitude and phase of which are indicative of the amount and direction of deviation of the image of said edge from said center of scan; means for modulating the image of said indicium at said predetermined frequency and phase when said indicium is a line, means responsive to said sensitive area for providing a resultant signal having a component of said fundamental frequency the amplitude and phase of which are indicative of the amount and direction of deviation of the image of said line from said center of scan; and means including a servo motor responsive to said resultant signals for moving said scanning device to orient said center of scan toward a reference position with respect to said indicium.

26. Apparatus for tracing along an indicium which may alternatively be a pattern line and an edge formed of two contrasting backgrounds comprising a scanning device defining a reference line and having a photoelectric sensitive area for viewing an image of a portion of said indicium, said sensitive area being bisected by said reference line, a light source for illuminating the indicium portion being viewed; selectively operable means including a switch for pulsating said light source at a predetermined frequency when tracing along an edge, means including said sensitive area for generating a signal of said predetermined frequency responsive to the pulsing light having a maximum amplitude when viewing only one of said backgrounds and a minimum amplitude when viewing only the other of said backgrounds, means providing a constant amplitude signal phased opposite to said generated signal and having an amplitude approximately midway between said maximum and minimum amplitudes, and means for adding said signals to provide a resultant signal the signal amplitude and phase of which are indicative of the amount and direction, respectively, of the deviation of the image of said edge from said reference line; selectively operable means including said switch for disrupting said light source pulsating means and for causing said sensitive area to cyclically scan the image of said indicium transversely to said reference line at said predetermined frequency when the apparatus is tracing a pattern line, said signal generating means generating a resultant signal of said predetermined frequency the signal amplitude and phase of which are indicative of the amount and direction, respectively, of the deviation of the image of the pattern line from said reference line; and means including a servo motor responsive to said resultant signals for moving said scanning device to orient said reference line towards a reference position with respect to said indicium.

No references cited.

ORIS L. RADER, *Primary Examiner.*

JOHN F. COUCH, *Examiner.*

T. LYNCH, *Assistant Examiner.*